United States Patent [19]
Basiev et al.

[11] Patent Number: 5,535,051
[45] Date of Patent: Jul. 9, 1996

[54] WDM OPTICAL FIBER SYSTEM USING CRYSTAL OPTICAL AMPLIFIER

[75] Inventors: Tasoltan T. Basiev, Moscow, Russian Federation; Paul M. Bridenbaugh, Somerville; Gordon A. Thomas, Princeton, both of N.J.

[73] Assignee: AT&T Corp., Murray Hill, N.J.

[21] Appl. No.: 377,569

[22] Filed: Jan. 24, 1995

[51] Int. Cl.⁶ .................. H01S 3/00; H01S 3/14
[52] U.S. Cl. ............. 359/342; 359/343; 372/39; 372/41
[58] Field of Search ................. 359/342, 343; 372/39, 41

[56] References Cited

U.S. PATENT DOCUMENTS

| 4,859,016 | 8/1989 | Shaw et al. | 372/6 |
| 5,130,996 | 7/1992 | Amano et al. | 372/41 X |
| 5,140,658 | 4/1991 | Sunshine | 385/49 |
| 5,323,401 | 11/1993 | Grubb | 372/6 |
| 5,341,389 | 8/1994 | Payne et al. | 372/41 |
| 5,416,789 | 5/1995 | Lejus et al. | 372/41 |

OTHER PUBLICATIONS

Y. Ohishi, et al., "A High Gain, High Output Saturation Power $Pr^{3+}$-Doped Fluoride Fiber Amplifier Operating at 1.3 μm", *IEEE Photonics Technology Letters*, vol. 3, No. 8, pp. 715–717, Aug. 1991.

*Primary Examiner*—Mark Hellner
*Attorney, Agent, or Firm*—George S. Indig

[57] ABSTRACT

Rare-earth doped single-crystal amplifiers serve to simultaneously amplify member channels of an optical fiber WDM system. A tailored amplification bandwidth sufficient for this purpose is the result of a variety of "defects" which after the local crystal field as "seen" by dopant ions.

12 Claims, 4 Drawing Sheets

WDM OPTICAL FIBER SYSTEM USING CRYSTAL OPTICAL AMPLIFIER

TECHNICAL FIELD

Wavelength Division Multiplexed (WDM) optical fiber communications.

DESCRIPTION OF RELATED ART

The erbium-doped silica-based fiber amplifier (EDFA) has had a profound effect on optical fiber communications. A number of improvements in the transmission fiber—lowered insertion loss and lowered chromatic dispersion—lead to inclusion in state-of-the-art single-channel systems. Span distances of hundreds of kilometers between optical-to-electronic repeaters is now common.

Long-postulated wavelength division multiplexing is becoming a reality, in large part, because of the EDFA. WDM systems, soon to be in operation, maintain span distance while increasing capacity by the number of WDM channels. A popular terrestrial design is 4-channel with 2.5 gbit/sec. capacity/channel, over 360 km-3-amplifier spans.

Of major significance—the EDFA amplification band is sufficient to simultaneously amplify all channels of a 4-channel WDM set. Its amplification band of about 12 nm—already adequate for a 10-channel system—is further broadened (to about 25 nm in recent designs). Capacity limitation due to four-wave mixing has been reduced by properly-designed systems and fiber.

Erbium emission is well suited for use in the low-loss fiber region including $\lambda$=1550 nm. For the most part, new high-capacity systems operate at this nominal wavelength.

Study has been directed to operation in another low-loss region—in the ~150 nm wide region centered about $\lambda$=1310 nm. A directly analogous solution to the EDFA has not been found. Praseodymium emits at the proper wavelength, but loses its energy to a radiationless transition in the silica-based fiber. One alternative uses a fluoride fiber (see, *Photonics Technology Letters*, vol. 3, No. 8 pp. 715–717 (Aug. 1991)). A promising approach, uses the familiar silica fiber and avoids praseodymium by Raman downshifting from a shorter-wavelength laser pump wavelength (U.S. Pat. No. 5,323,404, Jun. 21, 1994).

Use of a crystalline, rather than glass, host is described in U.S. Pat. No, 5,140,658, Aug. 18, 1992. Aside from offering means for avoiding the specific Pr-SiO$_2$ radiationless transition specific to the glass fiber, a crystal amplifier has additional advantages: smaller size; suitability for integration; etc. A specific example in the patent uses a single-crystal host of Y$_2$SiO$_5$ doped with Nd and emitting at a nominal wavelength of 1.31 µm.

SUMMARY OF THE INVENTION

A class of rare-earth doped single crystal optical amplifiers, suitable for use in WDM systems is described. Amplifiers of the invention retain the wellknown advantages of single crystal amplifiers while providing for amplification bandwidth tailored for simultaneous amplification of WDM channels.

The concept of band-tailoring is central. Rare earth dopant atoms, a category selected to have inherently narrow emission lines (of lesser width than the $\geq$5 nm required for effective simultaneous amplification of closely-spaced WDM channels). Band-tailoring invariably takes the form of line-broadening (to a breadth within desired minima and maxima). The sole-identified category of emitting atoms is the rare earth metals. Fortunately, there are candidates for use both at 1.3 µm and 1.55 µm. Co-dopants, e.g. for increasing absorption efficiency, are contemplated. There is a variety of suitable hosts. Categories which are amenable to emission broadening are set forth.

Suitable host and dopants are known. In the "Host Materials" section, a rationale for the observed line broadening is described. It considers both "inherent" defects (deviation from whole-number stoichiometry and site occupancies of nominal composition) and "extrinsic" defects (introduction of vacancies, or of substitutional or interstitial ingredients other than those of the nominal composition). The inventive teaching explains the origins of empirically-determined linewidth and predicts properties of untested but related compositions. Finally, it is a guide to identification of other crystal compositions and structures for the purpose.

Systems and subsystems for operation at a variety of system wavelengths, using optical amplifiers of either free-standing or epitaxial crystals, replacing or supplementing the EDFA, are described and claimed.

Terminology

Single Crystal—Free standing or epitaxial crystal constituted of a set of repeating unit cells which are sufficiently similar to avoid discernible grain boundary scattering as measured by light of the signal wavelength (i.e., in context of the invention, by light of the wavelength to be amplified).

Emitting Atom or Emitting Ion—The dopant, substitutional atom, replacing an atom of the nominal host composition, responsible for emission. An inventive requirement entails modification of local crystal electric field, so that some significant degree of ionic bonding is contemplated. Neither term precludes some accompanying covalent bonding. Simultaneous use of different emitting atoms is not precluded.

Linewidth—The half-amplitude spectral width of the emission band based on the average amplitude value of the encompassed band. The band may be essentially featureless or may include one or more local peaks or dips (if not harmful in operation).

WDM—Systems contemplated include a plurality of closely-spaced channels. Spacing is likely 2 nm or less, typically with a set of four or more channels, together defining a WDM band including a "system wavelength". Channels may be equally or unequally spaced.

DETAILED DESCRIPTION

Figure 1:
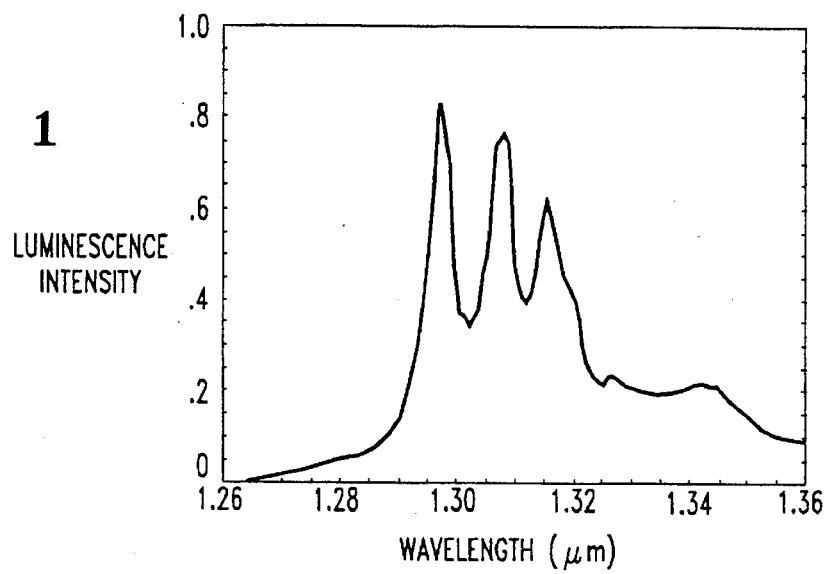
FIG. 1 in ordinate units of intensity and abscissa units of wavelength is a plot relating those units for an unacceptably narrow line emission in a well-ordered crystal.

General—Crystal compositions of the invention belong to a category which has generally been shunned. An appreciated attribute of a single-crystal host is the well-defined, narrow line emission due to the non-varying local crystal field values seen by all emitting atoms. Attributes are high amplitude efficient conversion of pump energy. Optimization of these attributes leads to selection of host crystals which are resistant to disorder and to emitting atoms with characteristically narrow emission lines. The rare earth elements, elements nos. 58–71 of the periodic table according to Mendeleev, are exemplary emitters.

The invention is specifically directed to rare earth amplifiers with broadened line breadth. Linewidth broadening is due to deliberate introduction of defects into the host crystal. Accordingly, preferred hosts exclude a number of familiar compositions—$Y_2SiO_5$, $YAlO_3$, YAG ($Y_3Al_5O_{12}$)—see FIG. 1 and accompanying description. Instead, preferred hosts include defect-prone compositions such as to vary from whole-number stoichiometry—(which may be regarded as including differing crystal compositions), or in which site occupancy may be interchanged in the nominal or deviant composition.

In the same manner, extraneous defects—interstitial as well as substitutional—may be introduced. These too, are incorporated for the explicit purpose of broadening the inherently narrow emission line associated with the emitting rare earth atom.

Band-tailoring necessarily entails broadening from too-narrow an emission spectrum. It also acknowledges that too great a spectral width—one substantially exceeding the composite band of the WDM channels—impairs efficiency. Attainment of an appropriately broadened emission spectrum makes use of widespread knowledge of the crystal grower. He will now deliberately choose growth temperature and other conditions; omit or adjust anneal conditions; introduce "contaminant" etc.

Conceptually, the requisite band-broadening requires statistical occurrence of defects to alter emission wavelength for a substantial fraction of emitting atoms. Considerations, which necessarily take account of the magnitude of influence of an individual defect, as well as numbers of defects, are described under "Mechanism".

Host Materials—Suitable crystalline compositions are prone to "defect" introduction. As briefly discussed, certain hosts known to be resistant to such influences are excluded. Classes and examples of suitable defect-prone hosts are also known (although often proscribed for device use). Accordingly, a sufficient teaching is based on the utilization of broadened rare-earth emission spectra for use in crystal optical amplifiers.

In this section, an attempt is made to classify this knowledge. Classes of candidate host materials are presented. They are sometimes not mutually exclusive. Included members are not necessarily operative for all rate earth dopants and wavelengths—any may be inoperative for fundamental reasons, e.g.: inadequate transparency for any wavelength to be transmitted; unavailability of a suitable substitutional site by virtue of size, charge; growth difficulty, etc. There may be host compositions which are not members of the listed classes. The invention requirement is uniform—occupying emitting dopant atoms must see varying local crystal fields. The invention requirement is satisfied for rare-earth doped crystals with emission spectra of at least 5 nm.

Host classes are sometimes described with reference to "ion", "cation", "anion", and other terms suggesting ionic bonding. The terminology is not intended to preclude the possibility of some covalent bonding. The terminology is appropriate since modification of the local crystal field as seen by the substituting emitting atom is central to the invention.

Figure 2:
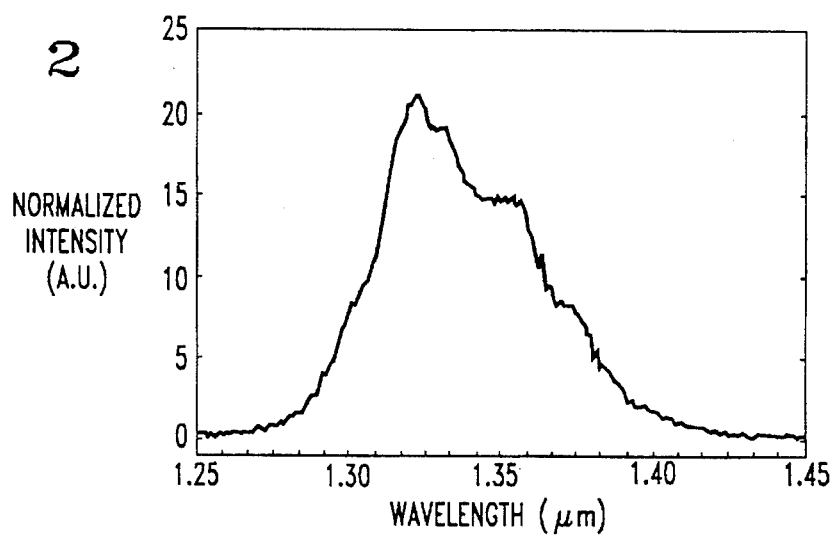
FIG. 2 is a plot showing band-tailored emission for the nominal crystal composition of FIG. 1 but with broadened emissions produced by partial substitution in the host composition.

Class I—FIG. 2 is illustrative of an "extrinsic substituent" composition. The terminology as used in crystallography assumes a crystal structure in which one or more equivalent crystallographic sites are populated by differing atoms. The FIG. 2 composition, used in Example 2, is of the $CaF_2$ crystal structure. The "pure" host—excluded from the Class—may be regarded as $SrF_2$; or after RE substitution, $Sr_{1-x}Nd_xF_{2+x}$ (the composition of FIG. 1/Example 1). Now considering calcium as the "extrinsic substituent", the nominal composition becomes:

$$(Sr_{1-y}Ca_y)_{1-x}Nd_xF_{2+x}. \tag{1}$$

Figure 3:
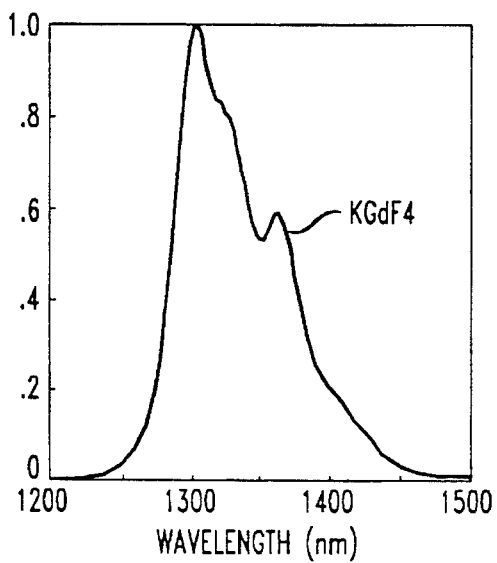
FIG. 3 is on the same coordinates, is a plot for substitution—broadened emission in a different crystal composition.

The Example of FIG. 2 uses the composition of Formula 1 and provides for mixed cation occupancy. The composition used in FIG. 3 depends on mixed anion occupancy—substituting OH for F, yields the formula:

$$(Gd_{1-x}K(RE)_xF_{4-y}(OH)_y). \tag{2}$$

The same substitution can be made with OD.

Member compositions are of this Class nominally stoichiometric. Even though no deviation is intended, minor non-stoichiometry is permitted (up to ±1% for any site or sites).

Class II—Like Class I, members of this class are "non-stoichiometric". Included compositions necessarily show a deviation from stoichiometry greater than ±1%—preferably greater than ±5%. The required stoichiometry may reflect population deviation for an individual site, or may be the total deviation for two or more sites. A prototypical Class II composition may simply consist of an unsubstituted composition with a deficiency of atom/atoms—with site vacancy/vacancies. Specific examples are substituted compositions in which introduction of a vacancy is somehow facilitated, perhaps due to size variation for a substituent atom.

Figure 4:
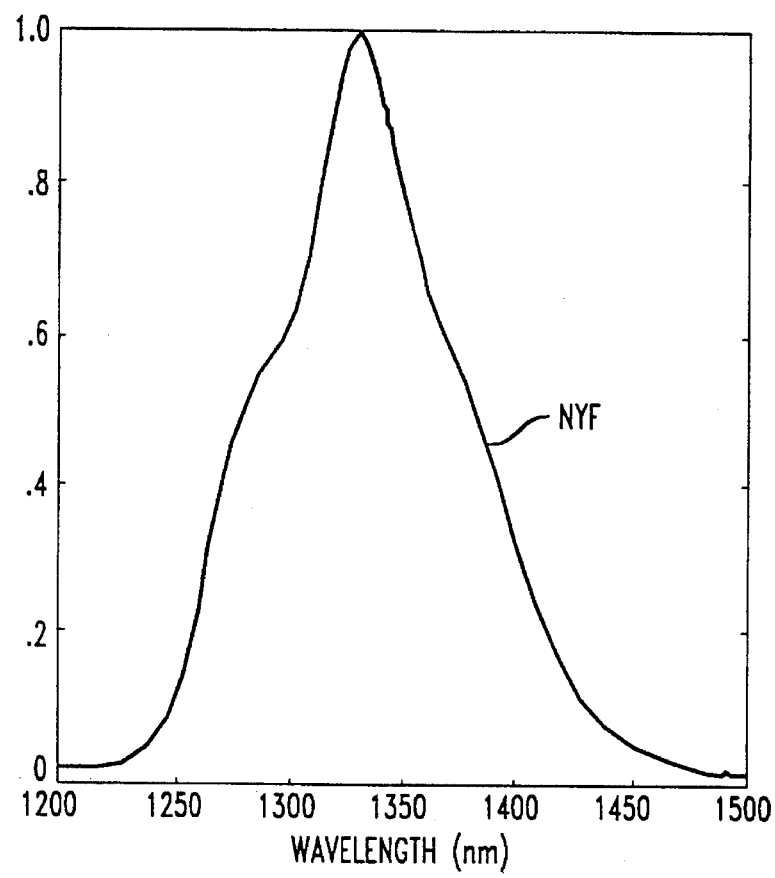
FIG. 4 is a similar plot in which band-tailoring is produced by introduction of extrinsic defects.

The host composition used in FIG. 4 is an example of this class. That composition, $Y_9Na_5F_{32}$, also of the $CaF_2$ crystal structure, may be rewritten as:

$$Y_{0.64}Na_{0.36}F_{2.28}. \tag{3}$$

Formulas based on electrical neutrality, achieved by vacancies at the cation site, alternatively can be written as a general formula

$$A_xB_yF_{x+3y}. \tag{4}$$

where A is monovalent and B is trivalent. Thus the above formula has a non-stoichiometry in F of 0.28/2=14%.

When a RE emitter atom, C, is added, the general formula is $$A_xB_{y-z}C_zF_{x+3y+3z} \quad (5)$$

Non-stoichiometric binary compounds (ignoring RE dopant) are contemplated, although particularly promising candidates were not identified for experiment.

Class III—Members of this class show "anti-site disorder". This crystallographic category requires multiple cation or anion "paired" sites which differ, and are nominally populated by specified pair members of "paired" ions. Anti-site disorder occurs when paired host ions—anionic or cationic—are interchanged. The terminology is used to describe three distinct cases: interchanged host cations; interchanged host anions; and occupation by substituent emitting ions in different of the paired cation sites. In all three cases, the relevant line broadening continues to be due to varying charge site environments as simultaneously "seen" by the emitting ions. Accordingly, the first two cases are of varying magnitude and depend upon the statistically determined proximity of the interchanged ion to the emitting ion. To first order, the magnitude of the third case is invariant, since primarily dependent upon the local field of the specific site occupied by the emitting ion. Two or more effects may occur simultaneously.

An example of Class III is $KGdF_4$, in which the paired ions—in this instance, paired cations—are potassium and gadolinium. The sites for these two cations are not equivalent—the occupant ion sees different local crystal fields. As rare-earth substituted, the composition becomes:

$$Gd_{1-x}K(RE)_xF_4 \quad (6)$$

The composition of Formula 2, presented as an example of anion substitution under Class I, permits broadening by the Class III mechanism as well. From the magnitude of the effect and based on experience with a variety of compositions, it is estimated that the Class III mechanism was operative.

In describing tested host members as included in one or more of the three described classes, it will be recognized that alternative descriptions of the member structures could be valid. As an example, members of Class II can be described in terms of interstitial atoms—the 0.28 excess of fluorine atoms of Formula 3 may suggest interstitial occupancy (in which event the required distortion in local field "seen by a RE emitting atom is explainable by an equivalent distortion; however produced by a different cause). The difference in mechanism invoked is, in a sense, purely philosophical. The classes presented dependably provide for all contemplated host compositions useful in practicing the invention.

Other means for introducing defects, likely of limited value, should not be precluded. Imperfections introduced into otherwise unvarying compositions, e.g., by growth conditions, yielding imperfect crystals, are generally to be avoided. Assurance of near-perfect optical properties—e.g. avoidance of grain boundaries—is a prime objective for a useful optical amplifying medium. Accordingly, crystal growth, whether of bulk or epitaxial crystal, will likely use growth conditions for avoiding such non-compositional defects. It is not expected that introduction of rapid quench; deliberate temperature increase; or other such procedures will be very useful. It may even be that some compositional variations described will require a greater degree of care during growth.

Standard crystal growth methods are applicable. For bulk crystals, Czochralski, Bridgeman and hydrothermal growth are suitable. Choice as among them depends on a variety of factors: e.g. for $KGdF_4$, decomposition at melt-temperature leads to desirability of hydrothermal growth. Laser ablation, chemical vapor deposition, and liquid phase epitaxy may be used for preparation of thin films. Liquid phase epitaxy from excess NaF is suitable for $Y_9Na_5F_{32}$. Appropriate methods for fabrication of integrated optical circuits are also known. These include pattern delineation, by direct writing or by use of masks; suitable registration for successive levels; etch techniques, chemical and plasma; ion milling; ion implantation; etc.

Host selection depends on dopant. The lifetime for 1.31 µm praseodymium emission ($^1G_4$) is characteristically short in oxide hosts. Fluorides are generally preferred. Host selection may affect emission wavelength. As an example, one neodymium emission line is shifted to 1.31 µm in strontium-calcium fluoride from its value of 1.41 µm in usual oxides. The same influence has been seen in other fluoride crystals and in fluoride-based glass.

Dopant—Acceptable dopant atoms have inherent emission linewidths of a maximum of 3 nm—as measured in a near-perfect, defect-resistant, crystalline host such as YAG. Rare-earth-doped crystals offer a range of emission wavelengths suitable for use in silica-based optical fiber systems. Studies have used Nd, Pr, and mixtures of the two for emission at the nominal wavelength 1310 nm. Er is suitable for use at 1550 nm.

Relatively-weak absorption for certain of the rare earths, may be compensated by use of one or more co-dopants. In experimental work, ytterbium, with its strong absorption at the nominal value, $\lambda=980$ nm, was found to effectively transfer energy to Pr in fluoride hosts. Use of a co-dopant for absorption may permit use of a more economical pump source.

High concentration of co-dopant—$\geq 10\%$ based on the total number of available rare-earth sites—broadens the emission line. In this amount, co-dopant is considered a useful alternative or supplement for tailoring emission breadth.

Identification of dopant atoms, emitting or absorbing, must take crystalline perfection into account. The dopant must fit the site to be occupied—in general should have a diameter which differs by no more than ±30% relative to the atom to be replaced. The ionic charge should be the same for the dopant and the substituted ion. For studied host, in which the atom to be replaced has a near-3+ charge, that charge state must be attainable by the substituent.

Relative to a glass host, use of a crystalline material permits high-dopant concentration without strong concentration quenching. Doping levels of 1–5 at % for emitting dopant are sufficiently small to statistically avoid clustering. The limitation is not relevant for non-emitting dopant (for codopant included for absorption).

Mechanism—Experimental data based on empirical determination has been analyzed. A proposed mechanistic explanation has successfully allowed identification of useful amplifier compositions.

Band-tailoring depends initially on band-broadening of the inherent emission spectrum of the rare-earth dopant atom. Broadening relies on modification of the local crystal (electrical) field. Contribution must take two factors into account. The first is the number of modifying influences (the number of defects) must be sufficient to affect a substantial number of emitting atoms. As a minimum, at least 50% of dopant atoms must be within the range of influence of the defect. The second concerns the magnitude of the effect—the range of influence of an individual defect.

Attempt at unification of the various types of defects studied experimentally is described in terms of a ratio of emission broadening to the concentration of defects expressed as a percentage of the number of available sites.

Always starting with the near-zero linewidth of a rare-earth, emission broadening, now considered as emission breadth, is conveniently expressed as bandwidth of an emission line in nm. The ratio for the composition of Example 2 is approximately 1 nm/%. Accordingly, the amplification band of 5 nm–30 nm requires approximately 5%–30% defect introduction. The ratio may not be rigorously accurate for the entire range, but is useful for initial design. In the instance of the $Sr_{1-x}Ca_xF_2$ composition of Example 2, the value of x is 0.05–0.30 for an assumed linear relationship between broadening and defect concentration.

In a material that produces minimal broadening, such as YAG, Pr has an inherent linewidth of ~2 nm before defect introduction—inadequate for contemplated use. In the example of $Y_9Na_5F_{32}$, this linewidth is broadened to >30 nm (with broadening entailing merger of discrete emission lines). This result is consistent with the ratio for Example 2.

The ratio for the OH defects of Example 3 is 130 nm/%, corresponding to a small required defect concentration (0.038%–0.230%) for producing a bandwidth of 5 to 30 nm.

The intuitive expectation, that introduction of the -OH dipole will have a longer range effect than that of Ca-for-Sr substitution, is clearly shown.

Regardless of class, broadening has the same order-of-magnitude effect on finite as well as near-zero inherent linewidth.

EXAMPLES

The numbered examples are illustrative of growth procedures suitable for preparation of free-standing crystals of contemplated compositions. An example is presented for each of: Bridgeman; Czochralski; and hydrothermal growth. In each instance, reference is made to a corresponding figure in which the relevant emission spectrum is reported. Only one example is presented for each growth technique. Preparation of the crystal used in developing the data of FIG. 2 is essentially identical to that used in Example 1, so that a separate example is not included.

Example 1

A crystal is fabricated from a Bridgeman-growth crystal by cutting, polishing and etching (etching serving for final shaping and removal of strained regions introduced during the previous shaping steps).

Powdered $SrF_2$ and $NdF_3$ were mixed to form the nominal composition $Sr_{0.99}Nd_{0.01}F_{2.01}$ and were placed in a graphite crucible 60 mm long×10 mm dia. and tapered to a point at the bottom. The crucible was lowered at a rate of 1 mm/hr through a temperature gradient of 10°–20° C./cm. The atmosphere was a dry mixture of 5% HF, remainder $N_2$—designed to keep the fluoride crystal free of $O_2$.

The data of FIG. 1 was developed for this crystal. The crystal was pumped by a flash lamp. As seen from the figure, resulting emission consists of three sharply-defined peaks 20, 21 and 22 at λ=1292 nm, 1307 nm and 1316 nm. Linewidth of each of the three is approximately 5 nm, with intervening troughs of approximately the same dimension.

The measured emission is unsuitable for contemplated WDM systems, likely including four or more channels within a total bandwidth of at least 5 nm.

FIG. 2 shows the emission spectrum for a composition corresponding with that of FIG. 1, but broadened to satisfy requirements of Class I. That composition (Formula 1) now shows a spectrum broadened to encompass the 1280 nm–1320 nm region, corresponding with the characteristic silica fiber "window" including λ=1310 nm.

Example 2

Crystals of $Na_{0.36}Y_{0.64}F_{2.28}$ were grown by the Czochralski method. Starting materials were pieces of single-crystal NaF and powdered $YF_3$ treated at 800° C. in flowing, anhydrous HF gas. Growth took place from a RF-heated, graphite crucible placed in an enclosed chamber. Prior to growth, the chamber was pumped down to a vacuum of $10^{-6}$ and repeatedly flushed with high purity argon. A slight positive argon pressure was maintained during growth. Growth rates of 1 to 4 mm/hr and rotation rates of 10–30 RPM were employed.

Example 3

Crystals of $KGdF_4$ were grown hydrothermally from solutions containing an excess of KF. Powdered anhydrous KF and $GdF_3$ were placed in a platinum-lined autoclave and sufficient water to produce a 70% fill was added. Autoclave temperature was 450° C. in the dissolving region and 425° C. in the crystallization region. Crystals of $KGdF_4$ grew both by recrystallization in the hot region and by transport to the cooler region.

WDM Systems—Initial work was directed to amplification for alternative or supplementary WDM operation in the 1310 nm "window" of silica fiber-based systems. Promising results now suggest use at the nominal system wavelength value of λ=1550 nm as well, possibly replacing the EDFA. U.S. patent application Ser. No. 08/159,179, filed Nov. 30, 1993 describes means for elimination of the -OH peak which separates these two recognized low-loss regions. Utilization results in an enlarged "window" extending from λ=1250 nm to 1670 nm. Crystal compositions are available for use over that entire spectrum.

Figure 7:
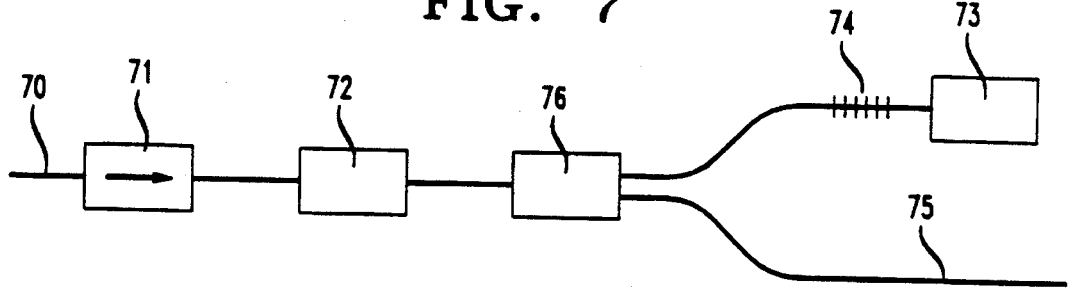
FIG. 7 is a circuit diagram of a WDM system including an amplifier of the invention.

The specific system of FIG. 7 is described in pending U.S. application Ser. No. 08/178,142, filed Jan. 6, 1994. Substituting a crystal amplifier for the EDFA, the circuit provides for an incoming signal on fiber 70, which is the terminal portion of the span for which amplification is required. The incoming signal, consisting of a set of WDM channels, next passes through isolator 71 which prevents transmission of back reflections from the amplifier. Amplifier crystal 72, e.g. of composition $Y_{0.53}Yb_{0.10}Pr_{0.01}Na_{0.36}F_{2.28}$ simultaneously amplifies the WDM channels of the set. The pump consists of laser 73, illustratively, a Ti-Sapphire laser operating at the nominal emission wavelength λ≅980. Interference grating 74, the interference grating may operate in the coherence collapse regime in accordance with Ser. No. 08/178,142. It then stabilizes pump emission of a bandwidth equal to the composite of all presented modes. Element 76, sometimes referred to as a "WDM" serves to separate signal and pump. In this instance, it directs the now-amplified signal to output fiber section 75.

Depending on needs, the system shown is supplemented. It likely includes additional series-connected spans, together bridged by optical-to-electronic amplifiers. It may include additional amplifiers, likely in parallel, operating at different system wavelengths. Such supplemental circuitry and apparatus are known.

The Figures—To a certain extent, figures have been described: FIGS. 1–4 under the numbered examples; FIG. 7 under "WDM Systems".

Figure 5:
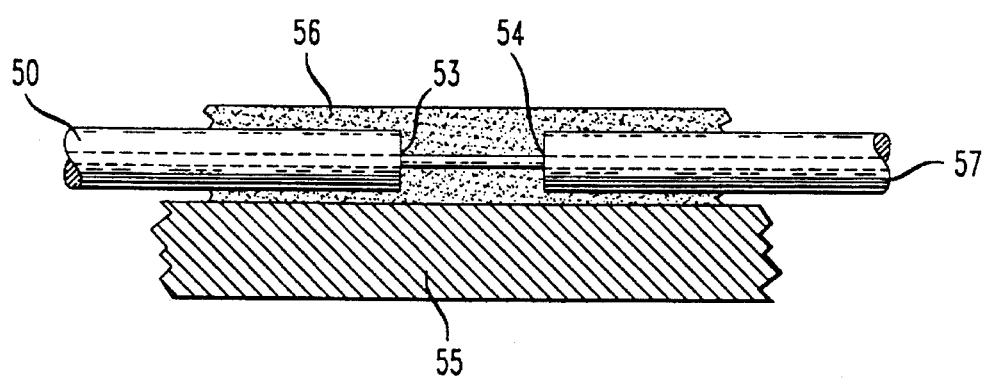
FIG. 5 is a cross-sectional view of an in-line, free standing, single crystal amplifier.

The apparatus of FIG. 5 consists of incoming and outgoing fibers 50 and 51 interconnected by amplifier crystal 52. Fibers 50 and 51 are of usual dimensions—typically a 6 µm single-mode core centrally located within a 125 µm fiber. The amplifier crystal is 1 cm in length and of square cross-section, 6 µm×6 µm. Amplifier 52 is butt-coupled to fibers 50 and 51 at joints 53 and 54. The fiber-amplifier structure is supported on silicon member 55, and the assemblage is surrounded by epoxy adhesive coating 56. The epoxy serves as optical cladding (with a refractive index approximately 1% lower than that of the amplifier crystal) and mechanically reinforces the joints.

Figure 6:
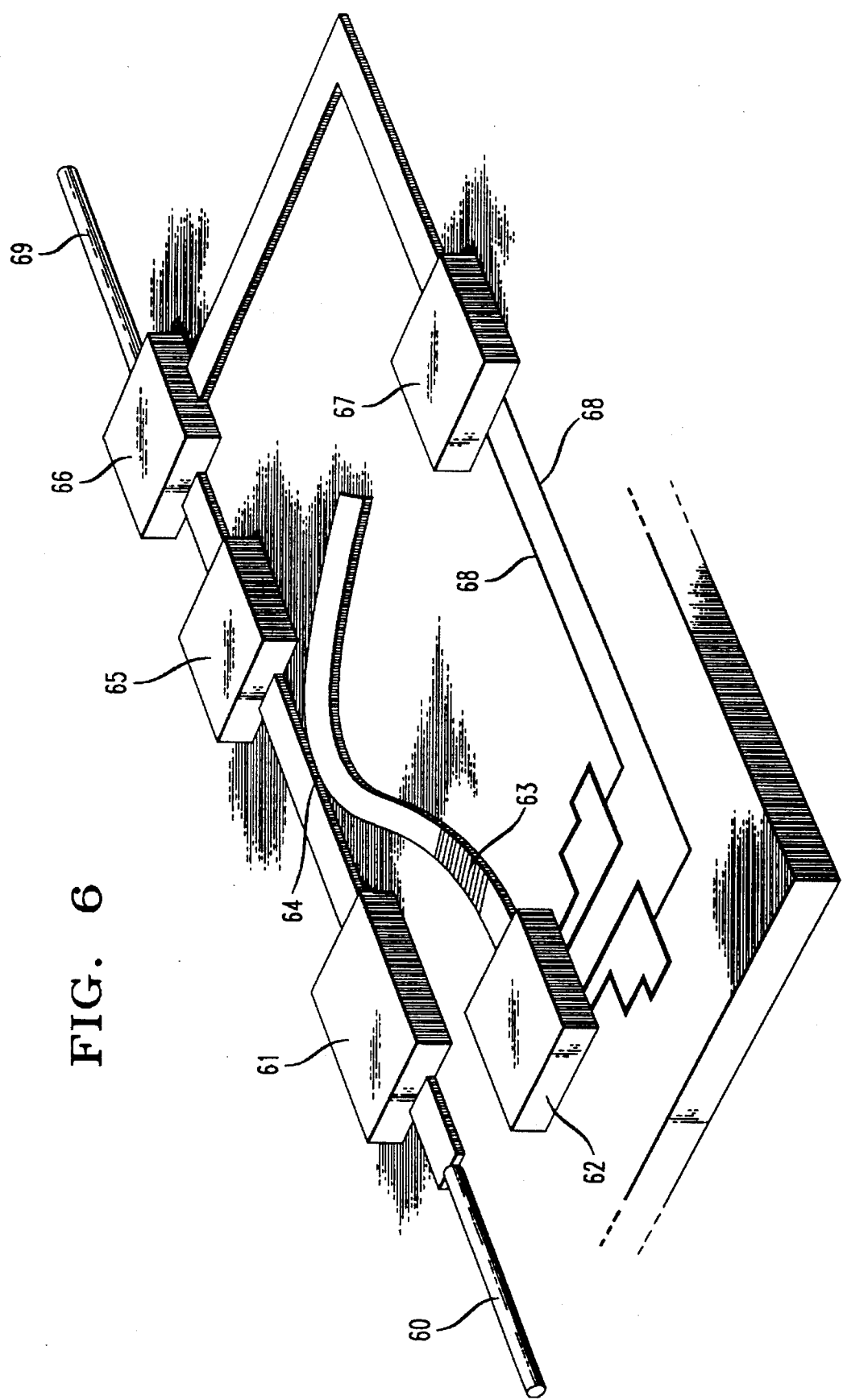
FIG. 6 is a perspective view of a portion of an optoelectric integrated circuit including an amplifier using an epitaxially-grown, RE-doped single crystal in accordance with the inventive teaching.

In the apparatus shown in FIG. 6, an incoming signal on fiber 60 is amplified to result in an outgoing signal on fiber 69. The incoming signal is first introduced onto a planar waveguide section connected to isolator 61 which prevents introduction of reflected radiation into the incoming fiber. From there, signal is introduced into optical amplifier crystal 65 which consists of a RE-doped epitaxially-grown single crystal of the inventive design. A second isolator 66 is attached to fiber 69. A feedback circuit includes monitor 67 and conductors 68 which together with an electrical source not shown biases pump laser 62 to lasing threshold. The laser output is stabilized by interference grating 63. Pump energy and signal are coupled at 64.

What is claimed is:

1. Apparatus comprising a WDM optical amplifier, for simultaneous amplification of a plurality of WDM channels, incorporating a single crystal host substitutionally-doped with a rare-earth emitting dopant atom, CHARACTERIZED IN THAT the host is of a defect composition selected from the group consisting of extrinsic substituent compositions, non-stoichiometric compositions and anti-site disordered compositions whereby the amplification bandwidth associated with the emitting dopant atom is broadened from an inherent spectral width of less than 5.0 nm to a spectral width of at least 5.0 nm by variation in the local crystal electric field for sites occupied by individual doping atoms.

2. Apparatus of claim 1 in which variation is induced by partial substitution in the host.

3. Apparatus of claim 2 in which a cation site is substituted.

4. Apparatus of claim 1 in which field variation is at least in part introduced by deviation from whole number stoichiometry of the host composition.

5. Apparatus of claim 1 in which field variation is at least in part introduced by anti-site disorder.

6. Apparatus of claim 1 including means for inputting a wavelength division multiplex signal consisting of a plurality of WDM channels which together have a composite bandwidth of at least 5 nm whereby all WDM channels are simultaneously amplified by the optical amplifier.

7. Apparatus of claim 6 consisting essentially of an integrated circuit in which the optical amplifier comprises an epitaxially-grown single crystal.

8. Apparatus of claim 1 in which a rare-earth dopant is selected from the group consisting of Er, Nd, and Pr.

9. Apparatus of claim 8 including a co-dopant for enhancing absorption of pump energy.

10. Apparatus of claim 9 including Pr together with Yb.

11. Apparatus of claim 1 including a pump for exciting the amplifier crystal.

12. Apparatus including means for inputting a wavelength division multiplex signal consisting of a set of WDM channels which together have a composite bandwidth of at least 5 nm together with a WDM optical amplifier for simultaneously amplifying the set CHARACTERIZED IN THAT the WDM optical amplifier contains a single crystal host substitutionally-doped with a rare-earth emitting dopant atom, in that the single crystal host is a defect-prone composition selected from the group consisting of extrinsic substituent compositions, non-stoichiometric compositions and anti-site disordered compositions, whereby the inherent spectral width of the rare-earth emitting dopant atom is broadened to enable simultaneous amplification.

\* \* \* \* \*